3,803,130
2-(2'-CYCLOPROPYLPHENOXYMETHYL) - 2-IMIDAZOLINE AND PHARMACEUTICALLY ACCEPTABLE SALTS THEREOF

Henry Najer and Jean-François Giudicelli, Paris, France, assignors to Synthelabo, Paris, France
No Drawing. Filed July 17, 1972, Ser. No. 272,142
Claims priority, application France, July 15, 1971, 7125858
Int. Cl. C07d 49/34
U.S. Cl. 260—239.5          4 Claims

ABSTRACT OF THE DISCLOSURE

A compound, 2-(2'-cyclopropylphenoxymethyl)-imidazoline of formula

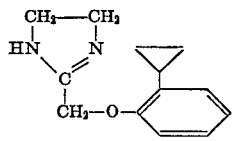

and pharmaceutically acceptable acid addition salts thereof, with vaso-constrictor properties, are prepared by reacting ethylene diamine with a 2-(cyclopropyl) phenoxyacetimidate or -acetamidine or by reacting an ester of 2-hydroxymethylimidazoline with a metal o-cyclopropyl phenolate.

---

The present invention relates to imidazolines.

The present invention provides 2-(2'-cyclopropylphenoxy methyl)-imidazoline of the Formula I

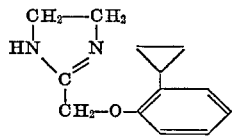

and the addition salts which this base forms with pharmaceutically acceptable inorganic or organic acids. Some of these acids, such as hydrochloric, sulphuric, nitric, acetic, tartaric and citric acids are devoid of pharmacological properties of their own, whilst others provide a therapeutic activity supplementary to that of the Compound I, such as the following acids:

prednisolone-21-benzoylmetasulphonic acid;
9α-fluoro-16β-methyl-11β,17α,21-trihydroxy-pregna-1,4-diene-3,20-dione-21-orthophosphoric acid;
11β,17α,21-trihydroxy-pregna-1,4-diene-3,20-dione-21-orthophosphoric acid;
11β,17α,21-trihydroxy-pregn-4-ene-3,20-dione-21-orthophosphoric acid, and
11β,17α,21-trihydroxypregn-4-ene-3,20-dione-21-succinic acid.

In this specification, temperatures are in degrees centigrade.

The invention further relates to a process for preparing the Compound I. This process consists of reacting ethylenediamine with an imino-ether or with an amidine of the general Formula II

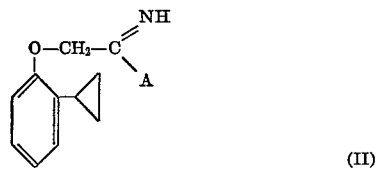

in which A represents either an alkoxy group or an amino group. The reaction generally takes place in an alcohol of low molecular weight, preferably in ethyl alcohol and at the reflux temperature of this solvent. The duration of heating is several hours, preferably four to six hours.

The imino-ether or the amidine of the general Formula II is prepared by condensing (2-cyclopropyl-phenoxy) acetonitrile (III)

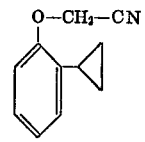

with an equimolecular amount of either an alcohol or an amine in an inert solvent, preferably chloroform, and passing a stream of hydrochloric acid through the solution until it is saturated. This condensation takes place at a low temperature, preferably between 0 and 10°, and the imino-ether (II) or the amidine (II) is recovered in the form of a hydrochloride by evaporating the solvent at a low temperature, preferably below 40°, in vacuo.

(2-cyclopropyl-phenoxy)acetonitrile (III) is prepared by heating equimolecular amounts of o-cyclopropylphenol and chloroacetonitrile in an inert solvent, preferably methyl ethyl ketone, in the presence of an acceptor for hydrochloric acid, preferably an alkali carbonate such as potassium carbonate. The heating temperature is the reflux temperature of the solvent and the duration of heating is several hours, preferably about ten hours.

It is also possible to prepare 2-(2'-cyclopropylphenoxy) methyl-imidazoline (I) by reacting an ester of 2-hydroxymethyl-imidazoline, for example for example a halide or a sulphonate, with a metal, preferably an alkali metal, for example sodium, o-cyclopropylphenolate. This condensation generally takes place in an alcohol, preferably in ethyl alcohol, and at the reflux temperature of the said solvent.

The salts of the Compound I are obtained by any known processes for the preparation of the addition salts.

The invention finally comprises the industrial applications of the Compound I and of its salts and more particularly their use as medicines. In effect, Compound I possesses pharmacological properties which make it valuable for therapy.

We give below the results of some comparative pharmacological tests carried out using the hydrochloride of the compound of the invention (Compound A) and the hydrochlorides of four imidazoline derivatives considered to be the most powerful currently known vaso-constrictors: oxymetazoline or 2-(4'-t-butyl-2',6'-dimethyl-3'-hydroxy-phenyl)methyl-imidazoline (Compound B), xylometazoline or 2-(4'-t-butyl-2',6'-dimethyl-phenyl)methyl-imidazoline (Compound C) fenoxazoline or 2-(2'-isopropyl-phenoxy)methyl-imidazoline (Compound D) and naphazoline or 2-naphthylmethyl-imidazoline (Compound E).

(1) Vaso-constrictor properties

These were tested:
(a) By the method of Binet and Burstein (Bull. Acad. Med., Paris, 1948, 132, p. 154).

An extra-corporal circuit which allows the blood from the right femoral artery to be diverted into the left femoral artery is installed in chloral-anaesteretized dogs. This circuit comprises a rubber tube into which are inserted, in series in a downstream direction, a perfusion apparatus of L. Henry and P. Jouvelet (built by Simal, Paris) and a pressure cell which records the variations in pressure in the perfused paw.

The arrangement is so adjusted that the blood passed into the left pawl circulates threin, before injection of any medicament, under a constant pressure which is equal to the carotid pressure recorded simultaneously.

The compound to be studied is injected into the rubber tube upstream from the pump. In each experiment, the dose administered is the same for all the compounds injected. The surfaces of the hypertensions which the various compounds, injected at the same dose and in succession, cause in the left paw are measured and compared. The results are collected in the table below.

|  | Dose (μg./kg.) | Ratio of the surfaces of hypertension in the paw | | | |
| --- | --- | --- | --- | --- | --- |
|  |  | A/B | A/C | A/D | A/E |
| Dog number: |  |  |  |  |  |
| 1 | 0.1 | 1.6 | 2.3 | 2.1 | 3.2 |
| 2 | 0.1 | 1 | 2.5 | 2.4 | 3.1 |
| 3 | 0.1 | 2.3 | 2.5 | 2.3 | 4.5 |
| 4 | 0.05 | 2.3 | 2.3 | 1.8 | 2 |
| Mean value |  | 1.8 | 2.4 | 2.15 | 3.2 |

(b) By renal oncography.

The intravenous injection of the vaso-constrictors not only causes a general hypertension but also a strong reduction in the volume of the kidney. The variation in volume of this organ after injection of the compounds A, B, C, D and K were therefore recorded and the surfaces of the graph corresponding to the renal vasoconstriction were compared with one another. The results are shown below.

|  | Doses (μg./kg.) | Ratio of the surfaces of renal vasoconstriction | | | |
| --- | --- | --- | --- | --- | --- |
|  |  | A/B | A/C | A/D | A/E |
| Dog number: |  |  |  |  |  |
| 1 | 4 | 1.65 | 3.5 | 2.6 | 3.1 |
| 2 | 2 | 1.5 | 2.9 | 3.2 | 3.4 |
| 3 | 2 | 1.8 | 2.6 | 2.8 | 2.9 |
| Mean value |  | 1.65 | 3 | 2.9 | 3.1 |

Compound A according to the invention is thus more active than the most powerful vaso-constrictors currently known.

(2) Local anaesthetic properties

Compound A is a local surface anaesthetic the activity of which is equal to that of fenoxazoline (Compound D) which itself is as active as cocaine hydrochloride.

Compound A thus differs advantageously from compounds B, C and E which are totally devoid of this property and yet are frequently of value in the treatment of acute rhinites.

The therepeutic appliactions of the Compound I and of its salts principally comprise their use in the symptomatic treatment of rhinological effections accompanied by nasal congestion, and especially: common coryza, acute and chronic rhinitis, sinusitis and the like.

The invention hence includes all pharmaceutical compositions which contain, as active principles, the Compound I and its salts, combined with any excipients appropriate for their nasal administration, either in the form of solutions prepared beforehand or in any form which allows the compounds of the invention to be dissolved at the time of use. These pharmaceutical compositions can also contain other medicinal substances with which the Compounds I are pharmaceutically compatible.

The solutions prepared beforehand or at the time of use are administered either by instillation of drops or by atomizing. The concentration of these solutions is between 0.1 part per thousand and 5 parts per thousand. They are administered two to four times daily (5 to 6 drops in each nostril, or the use of an atomizer).

The examples which follow illustrate the present invention.

EXAMPLE 1

(2-cyclopropyl-phenoxy)acetonitrile 23.2 g. (0.172 mol/g.) of o-cyclopropylphenol, 13 g. (0.172 mol/g.) of chloroacetonitrile, 23.8 g. (0.172 mol/g.) of anhydrous potassium carbonate and 70 ml. of methyl ethyl ketone are introduced into a 500 ml. two-neck flask equipped with a mechanical stirrer and a condenser surmounted by a calcium chloride tube. This mixture is heated, whilst stirring, for fifteen hours at the reflux temperature. The inorganic salts are filtered off and copiously washed with methyl ethyl ketone, the solvent is evaporated from the filtrate on a water bath in vacuo, the residue is dissolved in 100 ml. of ether, the ether solution is extracted with twice 70 ml. of 5 percent strength sodium hydroxide solution, the alkaline extracts are combined and washed four times in succession with 50 ml. of ether and thereafter all the ether phases are combined, washed with four times 50 ml. of water and dried over sodium sulphate. They are filtered, the ether is driven off the filtrate in vacuo on a water bath and the residue is rectified twice in vacuo.

15.8 g. (yield—53%) of (2-cyclopropyl-phenoxy)-acteonitrile are thus obtained in the form of a colorless liquid which passes over at 148–150° under 10 mm. $n_D^{26.5°} = 1.5402$.

Analysis for $C_{11}H_{11}NO$ (173): Calculated (percent): C, 76.27; N, 6.40; N, 8.08. Found (percent): C, 76.02, 76.02; N, 6.55, 6.57; N, 8.31, 8.15.

EXAMPLE 2

Hydrochloride of the ethyl imino-ether of (2-cyclopropyl-phenoxy)acetic acid 15.3 g. (0.088 mol/g.) of (2-cyclopropyl-phenoxy) acetonitrile, 4.1 g. (0.088 mol/g.) of ethyl alcohol and 70 ml. of anhydrous chloroform are introduced into a 250 ml. three-neck flask equipped with a condenser surmounted by a calcium chloride guard tube, an immersed alcohol thermometer and a gas bubbler tube. A stream of anhydrous hydrochloric acid is bubbled through this solution, cooled to 0°, for 1 hour 30 minutes and the solution is thereafter left overnight at ambient temperature. A slight precipitate is filtered off and washed with anhydrous ehter and the solvents are driven off the filtrate in vacuo on a water bath whilst avoiding the temperature rising above 40°. The solid residue is digested in 50 ml. of anhydrous ether and the compound is filtered off, washed several times with anhydrous ether on the filter and dried in vacuo over potassium hydroxide and phosphorus pentoxide.

18.5 g. (yield=82%) of the hydrochloride of the ethyl imino-ether of (2-cyclopropyl-phenoxy)acetic acid are thus collected in the form of a white crystalline compound which melts instantaneously at 130–137°.

EXAMPLE 3

2-(2'-cyclopropyl-phenoxy)methyl-imidazoline hydrochloride 8.95 g. (0.035 mol/g.) of the hydrochloride of the ethyl imino-ether of (2-cyclopropyl-phenoxy)acetic acid, 1.9 g. (0.032 mol/g.) of anhydrous ethylenediamine and 35 ml. of anhydrous ethyl alcohol are introduced into a 150 ml. three-neck flask equipped with a mechanical stirrer and a condenser surmounted by a calcium chloride guard tube and this mixture is heated at the reflux temperature for six hours. It is left to cool, a slight amount of insoluble matter is filtered off and washed with alcohol, and the alcohol is evaporated from the filtrate in vacuo on a water bath. The solid residue is triturated in 30 ml. of acetone, filtered off, washed with 20 ml. of acetone and recrystallized twice in succession from a 3:1 mixture of ethyl acetate and ethyl alcohol.

4.3 g. (yield=48.5%) of 2-(2'-cyclopropyl-phenoxy) methyl-imidazoline hydrochloride are thus obtained in the form of a white crystalline compound which is soluble in water and alcohols and which melts at 187°.

Analysis for $C_{13}H_{17}ClN_2O$ (252.5): Calculated (percent): C, 61.78; H, 6.78; N, 11.08; Cl, 14.03. Found (percent): C, 61.37, 61.37; H, 7.27, 7.49; N, 10.80, 10.89; Cl, 13.80, 13.70.

EXAMPLE 4

2-(2'-cyclopropyl-phenoxy)methyl-imidazoline hydrochloride 4.6 g. (0.2 atom/g.) of sodium metal are dissolved in 200 ml. of absolute alcohol in a three-neck one liter flask equipped with a mechanical stirrer and a reflux condenser surmounted by a calcium chloride guard tube. 13.6 g. (0.1 mol/g.) of o-cyclopropylphenol and 15.1 g. (0.1 mol/g.) of 2-chloromethyl-imidazoline hydrochloride are added and the mixture is heated to the reflux temperaure for one hour, whilst stirring. It is left to cool, the sodium chloride which has precipitated is filtered off and washed with alcohol, and the alcohol is driven off the filtrate in vacuo on a water bath. The residue is dissolved in 200 ml. of anhydrous ether, a slight amount of insoluble matter is filtered off and a stream of dry hydrochloric acid is passed into the ether filtrate until precipitation ceases. The hydrochloride of 2-(2'-cyclopropyl-phenoxy)methyl-imidazoline which is formed is filtered off and identified as the same compound as that prepared according to Example 3 by means of a mixed melting point and by means of its infrared and ultraviolet spectra.

What is claimed is:

1. 2-(2' - cyclopropyl - phenoxy methyl)imidazoline of the formula:

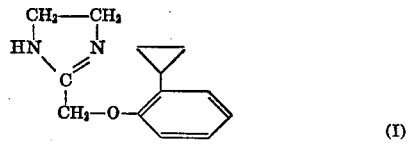

(I)

2. A pharmaceutically acceptable acid addition salt of 2-(2'-cyclopropyl-phenoxymethyl)-2-imidazoline.

3. A salt according to claim 2, wherein said salt is derived from hydrochloric, sulphuric, nitric, acetic, tartaric or citric acid.

4. A salt according to claim 2, wherein said salt is derived from prenisolone - 21 - benzoylmetasulphonic acid; 9α-fluoro-16β-methyl - 11β,17α,21 - trihydroxy-pregn-1,4-diene-3,20-dione-21-orthophosphoric acid; 11β,17α,21-trihydroxy - pregna-1,4-diene-3,20-dione-21-orthophosphoric acid; 11β,17α,21-trihydroxy-pregn-4-ene-3,20-dione-21-orthophosphoric acid or 11β,17α,21-trihydroxy-pregn-4-ene-3,20-dione-21-succinic acid.

References Cited

UNITED STATES PATENTS

| | | | |
|---|---|---|---|
| 2,516,108 | 7/1950 | Djerassi et al. | 260—309.6 |
| 2,915,431 | 12/1959 | Carron et al. | 260—309.6 |
| 3,198,703 | 8/1965 | Giudicelli | 260—309.6 |

NATALIE TROUSOF, Primary Examiner

U.S. Cl. X.R.

260—309.6, 453 R, 465 F, 564 R; 424—241, 273